Patented July 3, 1951

2,559,567

UNITED STATES PATENT OFFICE 2,559,567

METHOD FOR PREPARING SIMPLE TERTIARY THENYLAMINES

Howard D. Hartough, Pitman, and Sigmund J. Lukasiewicz, Woodbury, N. J., assignors to Socony-Vacuum Oil Company, Incorporated, a corporation of New York No Drawing. Application April 9, 1947, Serial No. 740,494

8 Claims. (Cl. 260—329)

The present invention relates to the preparation of simple tertiary thenylamines and, more particularly, to the products obtained by reacting formaldehyde or its polymers, ammonium chloride and a thiophene derivative in which one of the alpha carbons is blocked.

In application Serial No. 636,511 filed December 21, 1945, in the names of Howard D. Hartough and Sigmund J. Lukasiewicz, now abandoned, a method for producing thenylamines (aminomethylthiophenes), sub-resinous bodies, and resinous bodies, was described. In general, this procedure involved reaction of thiophene or alkylthiophenes or halothiophenes or alkoxythiophenes and the like or, in general, compounds having an unsubstituted thiophene nucleus or compounds having stable electro-positive substituents other than unstable $(OH)^-$ and $(NH_2)$ groups attached to the thiophene nucleus, formaldehyde or its polymers, and ammonium halide or amine salts. It was pointed out therein that the primary and secondary amines, $WCH_2NH_2HX$ and $W_2NHHX$, respectively, where W is one of the group thiophene and thiophenes having stable electro-positive substituent groups attached to the nucleus, can be isolated in pure state by distillation in vacuum. It was also pointed out that the simple tertiary amine had not been obtained and, in fact, a complex amine having chemical properties indicative of a polymeric amine structure containing several units of the

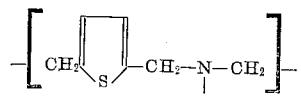

type was obtained. The sulfur content of this product is too low, while the nitrogen content and the molecular weight are too high for the trithenylamine. It has now been discovered that the simple tertiary amines can be obtained by reacting a thiophene derivative in which one of the alpha carbon positions is blocked. When it is desired to obtain the simple tertiary thenylamines, one of the alpha carbon positions is blocked with a substituent which can be readily replaced by hydrogen in a manner well known to those skilled in the art. On the other hand, when it is desired to obtain substituted tertiary thenylamines, the substituted thiophene is employed and the substituent group not replaced.

The following non-limiting examples are illustrative of the production of simple tertiary thenylamines and of simple substituted tertiary thenylamines.

Example I

A mixture of about 196 parts by weight of 2-methylthiophene (about 2 moles) and about 161 parts by weight of ammonium chloride (about 3 moles) is prepared and thoroughly agitated. To the well agitated mixture is added about 162 parts by weight of an aqueous solution of formaldehyde containing about 36 per cent by weight of formaldehyde (about 2 moles). After the addition of all of the formaldehyde solution, the mixture is warmed gently until the reaction is initiated and the reaction temperature allowed to rise and kept at about 80 to about 90 degrees centigrade. The reaction temperature is controlled within the aforesaid limits by the use of indirect cooling, if necessary. When the temperature of the reaction begins to decrease the mixture is heated to reflux and kept at that temperature for about 30 minutes. Thereafter, the reaction mixture is cooled to ambient temperatures, a solvent such as benzene added, and the reaction mixture neutralized with alkali, preferably an aqueous 40 per cent sodium hydroxide solution. The solvent layer is separated from the aqueous layer and the aqueous layer extracted one or more times with solvent. The extracts are combined and the solvent removed by distillation. The still residue is then subjected to fractionation under a reduced pressure to yield the following products in the amounts indicated: 5-methyl-2-thenylamine, 21 parts by weight, boiling point 68–69 degrees centigrade at 4 millimeters of mercury; di-(5-methyl-2-thienyl)methane, boiling point 135–136 degrees centigrade at 4 millimeters, 21 parts by weight; di-(5-methyl-2-thenyl)amine, boiling point 161–162 degrees centigrade at 4 millimeters, 39 parts by weight; tri-(5-methyl-2-thenyl)amine, boiling point 207–214 degrees centigrade at 3 millimeters, melting point 81–81.5 degrees centigrade, 32 parts by weight; and 83 parts by weight of a residue. Extraction of the residue with boiling alcohol yields an additional 10 parts by weight of tri-(5-methyl-2-thenyl)amine.

5-methyl-2-thenylamine

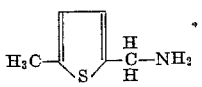
(I)

Di-(5-methyl-2-thenyl)amine

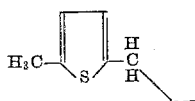
(II)

Tri-(5-methyl-2-thenyl)amine

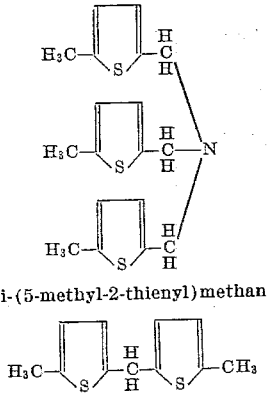
(III)

Di-(5-methyl-2-thienyl)methane

(IV)

These products were analyzed as follows:

|  |  |  | Calculated | Found |
|---|---|---|---|---|
|  |  |  | Per cent | Per cent |
| (I) | 5-methyl-2-thenylamine($C_6H_9N$) as N-(5-methyl-2-thenyl)-N'-phenyl-thiourea ($C_{13}H_{14}N_2S_2$) | Nitrogen | 10.69 | 10.45 |
| (II) | [di-(5-methyl-2-thenyl)amine] $C_{12}H_{15}NS_2$ | Sulfur | 27.00 | 27.03 |
|  |  | Nitrogen | 5.91 | 5.98 |
| (III) | [tri-(5-methyl-2-thenyl)amine] $C_{18}H_{21}NS_3$ | Sulfur | 27.68 | 27.73 |
|  |  | Nitrogen | 4.01 | 4.04 |
| (IV) | di-(5-methyl-2-thienyl)methane $C_{11}H_{13}S_2$ | Sulfur | 30.7 | 30.4 |

The 5-methyl-2-thenylamine absorbed carbon dioxide from the air too rapidly to obtain accurate analysis. Therefore, the N-(5-methyl-2-thenyl)-N'-phenylthiourea was prepared in order to identify this material. The phenylthiourea compound melted at 133–134 degrees centigrade and contained 10.45 per cent nitrogen. While the di-(5-methyl-2-thenyl)amine appeared to form a thiourea derivative with phenylisothiocyanate, no crystalline product could be obtained.

*Example II*

A mixture of about 490 parts by weight of 2-methylthiophene (about 5 moles) and about 535 parts by weight of ammonium chloride (about 5 moles) was prepared. The mixture was thoroughly agitated and during agitation about 425 parts by weight of an aqueous solution of formaldehyde containing 36 per cent formaldehyde (about 5 moles) was added. After the addition of all of the formalin solution the mixture was warmed to 40 degrees centigrade, at which temperature the reaction was initiated. The temperature of the reaction was controlled between about 60 to 70 degrees centigrade by means of an ice bath. Shortly after the reaction was initiated crystals began to form and within a short time a slurry developed which made stirring difficult. After about 30 minutes it was no longer necessary to cool the reaction mixture but agitation of the reaction mixture was continued for an additional hour and a half. After cooling the reaction mixture to about 10 degrees centigrade the mixture was filtered, the precipitate washed with benzene and recrystallized from about 6,000 parts by weight of water to yield 379 parts by weight of di-(5-methyl-2-thenyl)amine hydrochloride having a melting point of 216 to 217 degrees centigrade, with decomposition. This is a yield of about 56 per cent of theoretical. Upon analysis it was found that the amine hydrochloride contained 23.54 per cent sulfur and 5.36 per cent nitrogen. Calculated sulfur content for $C_{12}H_{16}ClNS_2$

[di-(5-methyl-2-thenyl)amine hydrochloride] is 23.40 per cent and for nitrogen is 5.12 per cent. The filtrate separated into a benzene layer and an aqueous layer. Upon evaporation of the benzene layer 82 parts by weight of the di-(5-methyl-2-thienyl)methane were recovered. A water and benzene insoluble oil in the amount of about 66 parts by weight was also obtained but not identified. It contained 16.3 per cent sulfur and 4.1 per cent nitrogen which cannot be reconciled with any simple amine structure. Neutralization of the water layer with aqueous sodium hydroxide followed by extraction thereof with benzene yielded 15 parts by weight of 5-methyl-2-thenylamine and about 109 parts by weight of a light red viscous oil having a sulfur content of 22.98 per cent; a nitrogen content of 7.87 per cent; and a hydroxyl number of 481.

*Example III*

A mixture of about 276 parts by weight of 2-t-butylthiophene (about 2 moles) and about 161.5 parts by weight of ammonium chloride (about 3 moles) was heated to about 75 degrees centigrade and about 84 parts by weight of an aqueous solution of formaldehyde containing about 36 per cent formaldehyde (about 1 mole) were added during a period of about 30 minutes. Thereafter the mixture was heated at about 85 to about 90 degrees centigrade for one hour, the reaction mixture cooled to ambient temperatures and the organic layer separated from the aqueous layer. The organic layer was diluted with petroleum ether and about 14 parts by weight of tri-(5-t-butyl-2-thenyl)amine hydrochloride separated out. The tertiary amine hydrochloride was recrystallized from alcohol and had a melting point from 204 to 206 degrees centigrade with decomposition. Distillation of the filtrate permitted recovery of unreacted 2-t-butylthiophene and yielded an additional 44 parts by weight of tri-(5-t-butyl-2-thenyl)amine hydrochloride as a residue. On analysis of the amine hydrochloride it was found to have a sulfur content of 19.20 per cent and a nitrogen content of 2.81 per cent. The calculated sulfur content of the compound $C_{27}H_{40}ClNS_3$ is 18.94 per cent and the calculated nitrogen content is 2.83 per cent.

Neutralization of the water layer with 40 per cent aqueous sodium hydroxide solution followed by extraction with benzene yielded 4.5 parts by weight of a light yellow oil having a sulfur content of 15.9 per cent and a nitrogen content of 8.5 per cent.

The present application is a continuation-in-part of our earlier filed application Serial No. 636,511, filed December 21, 1945.

We claim:

1. A method for producing tri-(5-alkyl-2-thenyl) amine which comprises mixing 2-alkylthiophene, formaldehyde and an amount of ammonium halide having a molecular weight greater than 38 in excess of the molal equivalent of said 2-alkylthiophene holding the mixture at temperatures not greater than reflux to obtain a reaction mixture containing tri-(5-alkyl-2-thenyl) amine hydrohalide, separating said tri-(5-alkyl-2-thenyl) amine hydrohalide from said reaction mixture and recovering tri-(5-alkyl-2-thenyl) amine.

2. A method for preparing simple tertiary thenylamines as set forth and described in claim 1 in which the reaction temperature is about 80° to about 90° C.

3. A method for preparing tri-(5-methyl-2-thenyl) amine which comprises mixing 2-methylthiophene, an amount in excess of the molal equivalent of said methylthiophene of ammonium halide having a molecular weight in excess of 38 and formaldehyde to form a reaction mixture, heating said reaction mixture to about 80° to about 90° C., cooling said reaction mixture to ambient temperature, neutralizing said reaction mixture with aqueous metal hydroxide, extracting said neutralized solution with a solvent for thenylamines, removing said solvent, and recovering tri-(5-methyl-2-thenyl) amine.

4. A method for preparing tri-(5-tertiarybutyl-2-thenyl) amine which comprises mixing 2-tertiarybutylthiophene, formaldehyde and an amount of ammonium halide having a molecular weight greater than 38 in excess of the molal equivalent of said tertiarybutylthiophene to form a reaction mixture holding said reaction mixture at about 85° to about 90° C., and recovering tri-(5-tertiarybutyl-2-thenyl) amine.

5. A method of preparing simple tertiary thenylamines which comprises mixing (A) thiophene having 1 to 3 substituent groups only one of said substituent groups being attached to an alpha nuclear carbon atom and said substituent groups being selected from the group consisting of alkyl, alkoxy and halogen, (B) one of the group consisting of formaldehyde and reversible polymers of formaldehyde and (C) more than a molar equivalent based upon the amount of said thiophene of an ammonium halide and holding said mixture at a temperature not greater than reflux.

6. A method of preparing simple tertiary thenylamines which comprises mixing (A) a mono-substituted thiophene, said substituent being selected from the group consisting of alkyl, alkoxy and halogens and being attached to an alpha nuclear carbon atom, (B) formaldehyde and (C) an amount of ammonium chloride in excess of the molar equivalent of said thiophene, and holding said mixture at a temperature not greater than reflux.

7. A method of preparing simple tertiary thenylamines which comprises mixing (A) thiophene having 1 to 3 substituent groups only one of said substituent groups being attached to an alpha nuclear carbon atom and said substituent group being selected from the group consisting of alkyl, alkoxy and halogens, (B) one of the group consisting of formaldehyde and reversible polymers of formaldehyde and (C) an amount of ammonium chloride in excess of the molar equivalent of said thiophene, and holding said mixture at a temperature not greater than reflux.

8. The method of preparing simple tertiary thenylamines as set forth and described in claim 7 wherein the reaction temperature is about 60° C. to about 90° C.

HOWARD D. HARTOUGH.
SIGMUND J. LUKASIEWICZ.

REFERENCES CITED

The following references are of record in the file of this patent:

Alles: J. Pharm. & Exp. Ther. 72, 265 (1941).
Holdren: J. Am. Chem. Soc. 68, 1198–1200 (1946).
Adams: "Organic Reactions," vol. 1, pp. 304 and 311, Wiley, N. Y., 1942.
Morton: "The Chemistry of Heterocyclic Compounds," p. 42, McGraw-Hill, N. Y., 1946.